Figure 4:
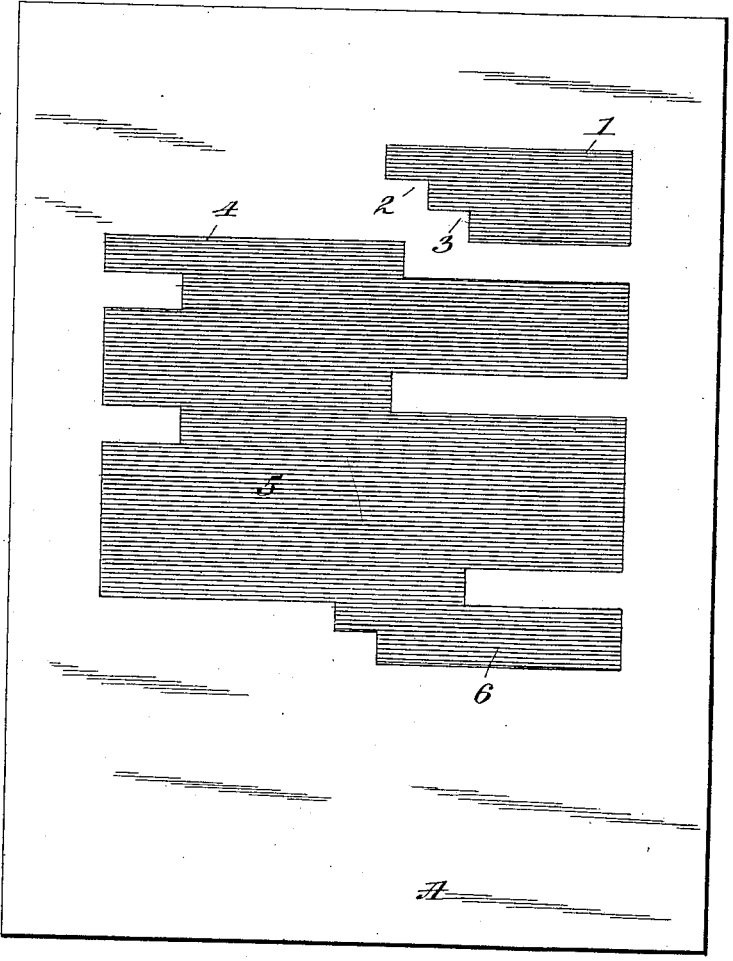

E. R. GARFIELD.
METHOD AND APPARATUS FOR TEACHING MANUSCRIPT FORM.
APPLICATION FILED NOV. 25, 1918.
1,328,952.
Patented Jan. 27, 1920.
2 SHEETS—SHEET 1.
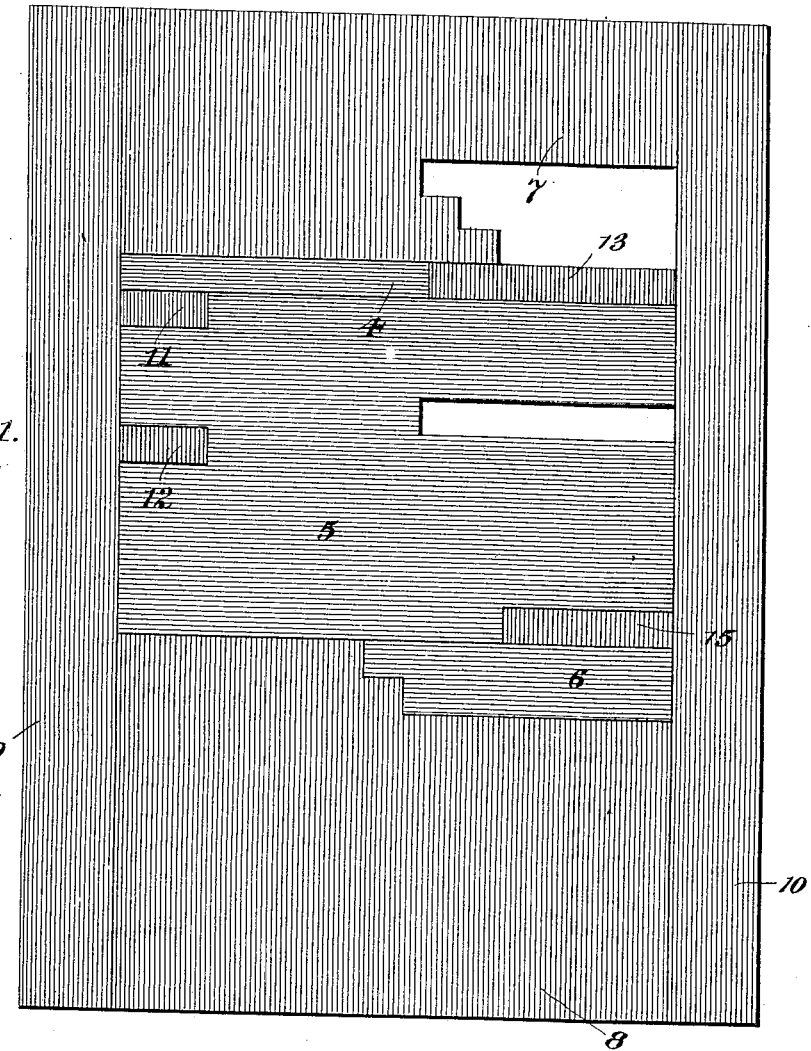
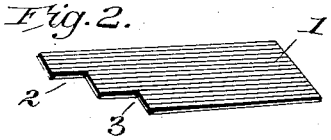
Inventor:
Elva R. Garfield,
By Dodge and Sons,
Attorneys E. R. GARFIELD.
METHOD AND APPARATUS FOR TEACHING MANUSCRIPT FORM.
APPLICATION FILED NOV. 25, 1918.

1,328,952. Patented Jan. 27, 1920.
2 SHEETS—SHEET 2.

Inventor
Elva R. Garfield,

By Dodge and Sons,
Attorneys.

UNITED STATES PATENT OFFICE.

ELVA R. GARFIELD, OF NEW YORK, N. Y.

METHOD AND APPARATUS FOR TEACHING MANUSCRIPT FORM.

1,328,952.  Specification of Letters Patent.  Patented Jan. 27, 1920.

Application filed November 25, 1918. Serial No. 264,063.

*To all whom it may concern:*

Be it known that I, ELVA R. GARFIELD, a citizen of the United States, residing at New York, in the county of New York and State of New York, have invented certain new and useful Improved Methods and Apparatus for Teaching Manuscript Form, of which the following is a specification.

This invention pertains to an improved method and apparatus for teaching manuscript form and arrangement.

The principle underlying the invention is to place in the hands of the student, a device or structure comprising a series of segregated elements which when assembled will in effect produce a picture of the form or letter in which the various component elements of the letter or other manuscript form stand in the proper relation to each other and to the letter sheet or form as a whole. In other words, the underlying principle involves the production of a picture of a letter or form in the making of which the student has impressed upon his mind, consciously or otherwise, a clear idea of the parts, their relative quantities and arrangement. Aside from this, the invention has for its object the placing in the hands of the teacher a form which is in accordance with good usage and likewise correct from the viewpoint of artistic arrangement, it being my purpose to place the device upon the market in such shape that both points will be clearly present and not subject to change due to whim or caprice or the absence of artistic ability or temperament, of any particular teacher. This not only relieves the teacher of the burden of studying out the forms but also insures a correct presentation thereof to the pupil.

Emphasis on form alone is an aid to clearness. Probably one reason for difficulty in teaching manuscript form is the fact that one often requires too much else at the same moment; the pupil must copy correctly with all that that implies; or, if writing an original composition, he must think of the content; and perhaps he must listen to explanatory remarks from the teacher with any one of these. Of course, there are times when pupils must think of various things at once, but during the period of learning a formal phase it must often be separated from other phases. Obviously one main purpose of the present plan is to provide for effective separation.

Figure 5:
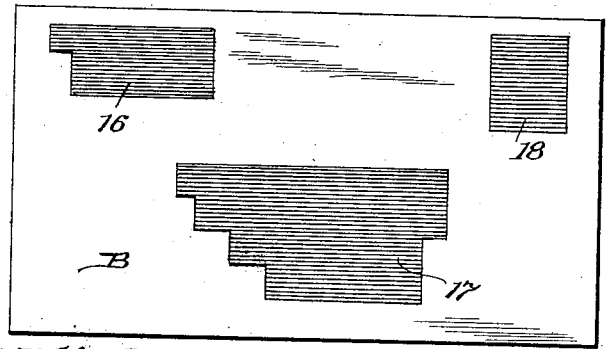
Figure 6:
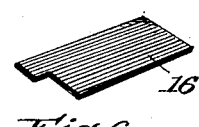

In the annexed drawings, two embodiments of the invention are illustrated, wherein:

Figure 1 is a plan view of a letter form, composed of a series of cards or blocks, two of which are removed;

Fig. 2 a perspective view of one of the blocks or cards, that which represents the heading of the letter;

Fig. 3 a like view of a block representing the left over portion or blank space of a line;

Fig. 4 a plan view of a card or sheet wherein the complete letter form is imprinted in color thereon;

Fig. 5 a plan view of an envelop with the various elements imprinted thereon; and Fig. 6 a perspective view of a block employed in conjunction with such envelop.

Having reference first to Figs. 1 to 4 inclusive, in which a letter form is outlined, A (Fig. 4) represents a sheet of cardboard or the like having imprinted thereon and in a color contrasting with that of the body of the board, the various component elements of the letter. They may be said to comprise a heading block 1, usually of three lines in width and indented at one end, as at 2 and 3, Fig. 2, to correspond to the accepted form of writing the heading. The salutation block is denoted by 4, the body block by 5 and the complimentary close and signature block by 6, all of said blocks as well as 1 being colored alike, as blue. The top margin block is designated by 7, the lower one by 8, and the side margin blocks by 9 and 10, respectively. The indention blocks are denoted by 11 and 12, while the blocks employed to fill in the spaces at the ends of the lines in the body are numbered 13, 14 and 15.

Said blocks 7 to 15 inclusive will be colored or left white to contrast with the others so that the manuscript elements of the letter will stand out in relief and the letter form as a whole clearly depicted. The picture thus formed and the sense of proportion and arrangement of the parts will be unconsciously borne or impressed upon the pupil's mind. No two cards, it is to be noted, other than the interchangeable indention cards 11 and 12 and the marginal cards 9 and 10 (or these latter may vary according to the particular form employed) are alike in size, though under some forms the end line blocks 13, 14, and 15, may also be of the same dimensions, consequently there is presented to the pupil that which may be termed a cut-up puzzle the completion or bringing together of which to its proper form will produce a picture of a letter. Furthermore, it is impossible to assemble the various blocks or cards to produce the complete sheet without placing each of the component elements or blocks in its proper position.

The card or sheet A shown in Fig. 4 will preferably be used by the teacher as a guide card, though the card may be used as a first step in the teaching of a form by permitting the pupil to place the blocks 4, 5 and 6 upon the printed portion of the card A. As the pupil advances the base card A may be omitted and the pupil given an entire set of blocks, as shown in Figs. 1 to 3, and permitted to assemble the same to make a complete form.

In Figs. 5 and 6 an exposition of the invention is made in connection with an envelop wherein 16 denotes the block corresponding to the sender's address or business card, 17 the card or space corresponding to the name and address of the addressee and 18 the stamp. These will be printed upon a card, as B, which is of the proper size and shape of the desired envelop, and preferably will be in a color in contrast with that of the body of the card. Separate blocks, such as shown in Fig. 6, which correspond to the sender's address or business card, will be provided, which the pupil will place upon the corresponding imprinted portions of the base card B. It is to be noted that with this form the card is not cut up in its entirety for to do so would produce narrow pieces which would readily become torn or broken in use.

It will, of course, be understood that any desired manuscript form may be employed and the blocks produced in accordance therewith. Business, social, and legal forms are, of course, different, and with various sets of cards made to fit each requirement, the teacher may readily impart to the pupil the desired outline or picture for each and explain the characteristic features of each.

While it is preferred to produce the structure from cardboard, it is, of course, to be understood that it may be formed from other material or substance and of a thickness in excess of that of ordinary cardboard such as is illustrated in the drawings.

It is conceivable that the blocks representing the manuscript elements may be manufactured with words or other symbols printed either on the front or back surfaces thereof.

What is claimed is:

1. That method of teaching manuscript or correspondence form and arrangement by means of blocks which consists in taking a series of such blocks depicting the various manuscript elements which enter into the form and assembling them with other blocks, which latter correspond to blank and marginal portions thereby producing a sheet wherein the representation of the various manuscript elements bear the proper relation to each other and to the sheet thus produced.

2. That method of teaching manuscript or correspondence form and arrangement by means of blocks which consists in taking a series of such blocks outlined or contoured to correspond to the shape of the various manuscript elements which enter into the form and assembling them with other blocks outlined or contoured to correspond to the shape of the various blank and marginal portions, thereby producing a sheet wherein the various manuscript elements bear the proper relation to each other and to the sheet as a whole.

3. That method of teaching manuscript or correspondence form and arrangement which consists in taking a series of colored blocks depicting the various manuscript elements which enter into the form, and assembling them with other blocks of a contrasting color and outlined to correspond to the blank and marginal portions of the form, thereby producing a sheet wherein the various manuscript elements bear the proper relation to each other and to the sheet as a whole.

4. That method of teaching manuscript or correspondence form and arrangement, which consists in producing in color upon a sheet, block-like configurations corresponding to the manuscript elements, severing such elements and the remaining blank portions, thereby producing a series of interfitting blocks and thereafter asembling said blocks to reproduce the form.

5. As a new article of manufacture for teaching manuscript or correspondence form and arrangement, a plurality of interfitting blocks representing when assembled in proper juxtaposition a complete sheet, certain of said blocks being outlined or shaped to correspond to the manuscript elements entering into the form.

6. As a new article of manufacture for teaching manuscript or correspondence form and arrangement, a plurality of interfitting blocks representing when assembled in proper juxtaposition a complete sheet, certain of said blocks being outlined or shaped to correspond to the manuscript elements entering into the form and being colored to contrast with the remainder of the blocks.

7. As a new article of manufacture for teaching a letter form, a plurality of interfitting blocks producing when assembled in proper juxtaposition a simulation of a letter sheet, certain of said blocks being colored and depicting respectively by their contour the heading, salutation, body portions, and complimentary close and signature of the letter.

8. That method of teaching manuscript or correspondence form and arrangement which consists in outlining or depicting, in the shape of blocks, the various manuscript elements which enter into the form and placing the same in proper juxtaposition with reference to each other and to marginal and body portions of the unwritten section or sections of the form.

In testimony whereof I have signed my name to this specification.

ELVA R. GARFIELD.